Patented Dec. 27, 1932                                                    1,892,227

UNITED STATES PATENT OFFICE

ARTHUR VOSS, OF FRANKFORT-ON-THE-MAIN-HOCHST, GERMANY, ASSIGNOR TO I. G. FARBENINDUSTRIE AKTIENGESELLSCHAFT, OF FRANKFORT-ON-THE-MAIN, GERMANY

HARDENED ARTIFICIAL MATERIALS AND PROCESS OF PREPARING THEM

No Drawing. Original application filed January 7, 1930, Serial No. 419,191, and in Germany September 29, 1927. Divided and this application filed April 27, 1931. Serial No. 533,357.

My present invention relates to hardened artificial materials and process of preparing them, more particularly to materials consisting of or containing insoluble and infusible resins containing chemically entirely indifferent carboxyl groups.

The afore-said resins containing carboxylic acid groups (hereinafter referred to for convenience as "resin-carboxylic acids") may be obtained by reaction between a phenolaldehyde resin and a halogen fatty acid or a salt thereof, or by reaction between a phenoxy-fatty acid and formaldehyde or a substance yielding formaldehyde. I have moreover found that insoluble and infusible resins are obtained by transforming the said resins containing carboxyl groups in water-soluble compounds by neutralizing them wholly or partially with ammonia or the derivatives thereof, as, for instance, methylamine or pyridine, then evaporating the aqueous solution and heating the residue at a temperature between 100° C. and 200° C., preferably at about 150° C. to 160° C.

If desired, a filling material may be associated with the aqueous solution of the ammonium or other salt of the resin-carboxylic acid. New artificial materials may, for instance, be made by impregnating paper-pulp with the aqueous solution, pressing into a suitable mould and hardening by heating. By impregnating wood-paste which is obtainable cheaply in commerce, with the solution, it is thus possible to manufacture molded articles of any shape, such as pipes, boxes, containers, dishes, casks, barrels, and other various kinds of articles of general utility. Artificial masses may also be made by impregnating paper web, superposing a number of layers of the impregnating web, and subsequently hardening the mass.

The molded articles thus obtained have valuable properties; in particular, they are entirely water-proof and extraordinarily resistant to mechanical and chemical action. According to the purpose for which the products are intended there may be used instead of a paper-pulp or web another filling material, such as asbestos fibers, sawdust, infusorial earth, powdered horn or the like. The products have a low electrical conductivity, and are, therefore, well suited for electrical insulation. They are also applicable as substitutes for shellac and the manufacture of stiffenings for hats or caps.

By a further feature of the invention, the resin-carboxylic acids may be converted into useful hardened products by heating their ammonium salts, or salts of ammonia derivatives at a temperature above 100° C. in the presence of a polyhydric alcohol of low volatility, such as glycol, glycerin, mannitol, polyvinyl alcohol, a carbohydrate soluble in water, or the like. The hardening operation may also in this case be conducted in presence or absence of a filling material. In this method of operating, it is even possible to dispense with the conversion of the resin-carboxylic acid into its salt, and the invention accordingly includes a manufacture of hardened artificial material by heating a resin-carboxylic acid at a temperature at above 100° C. in the presence of a polyhydric alcohol of low volatility, with or without addition of a filling material, for example, the resin-carboxylic acid is dissolved in alcohol, the solution is mixed with a quantity of glycerin, equimolecular to that of the resin acid, or an equimolecular quantity of another polyhydric alcohol of low volatility, such as penta-erythritol, the solution is evaporated and the residue hardened as already described. In some cases, the solvent may be dispensed with, it being sufficient merely to mix the resin-carboxlylic acid and the polyhydric alcohol, and to heat the mixture to the necessary temperature.

Products of particularly good elasticity are obtained by using as the polyhydric alcohol, polyvinyl alcohol, obtainable by saponification of polyvinyl acetate.

The following examples illustrate the invention, the parts being by weight:

(1) The resin-like product obtained by condensation of equal parts of commercial tricresol and formaldehyde of 30 per cent strength in the presence of about 10 per cent of an alkali is mixed, without being freed from the alkali used for the condensation, with a quantity of a concentrated aqueous solution of an alkali such that the total quantity of the alkali present is equivalent to the quantity of the cresol used. Into the clear aqueous solution thus obtained there is introduced in the form of a concentrated aqueous solution, a quantity of sodium chloracetate also equivalent to the cresol used, at a temperature of about 60° C. to 70° C. To a condensation product obtained from 108 parts of cresol, 108 parts of formaldehyde of 30 per cent. strength and 30 parts of concentrated caustic soda solution of 42° Bé., there are added to a moderate temperature (40° C. to 50° C.) a further 90 parts of caustic soda solution and 116.5 parts of sodium chloracetate, the whole being maintained at about 40° C. to 50° C. until all sodium chloracetate has been introduced, after which it is heated for a short time at 95° C. to 100° C. for the purpose of accelerating the reaction. The resin-acid product is precipitated by acidification with hydrochloric acid; it is a whitish resinous mass which when cold easily crumbles, but becomes soft at a moderately raised temperature. It is washed, dissolved in 400 parts of warm aqueous ammonia of 10 per cent. strength, and the clear, feebly colored solution produced which has a slightly ammoniacal smell, is mixed with an aqueous solution of 25 parts of polyvinyl alcohol. After evaporating the solution thus obtained on a water bath, there remains a clear resinous residue, which when further heated to about 150° C. to 170° C. gradually becomes converted into a hard mass which is entirely insoluble and infusible, but nevertheless very elastic; it may conveniently be used for the preparation of articles which are required to be resistant toward thrust or other mechanical action.

(2) 100 parts of the phenol-formaldehyde condensation product known as "bakelite A" are caused to react in the manner already described with chloracetic acid, and the resin-acid thus obtained is dissolved in aqueous ammonia as described in Example (1). The aqueous solution is mixed with 15 parts of glycerin of 97 per cent. strength, the mixture is kneaded with a quantity of paper-pulp of 22 per cent. strength, such that a uniform pasty mass is produced. The mass is freed from a part of the solution by pressing, the solid cake thus obtained is pressed in suitable moulds which are then heated internally or externally. There are thus obtained homogeneous hardened objects which are very resistant to mechanical and chemical actions and are distinguished by their low specific gravity.

This application is a division of my copending application Serial No. 419,191, filed January 7th, 1930.

I claim:

1. The process which comprises treating phenolaldehyde condensation products containing carboxyl groups with a nitrogen base selected from the group consisting of ammonia, aliphatic amines and cyclic amines and heating the water-soluble compounds thus obtained with a polyhydric alcohol to a temperature of between 100° C. and 200° C.

2. The process which comprises treating condensation products obtained from a phenolaldehyde resin and a halogen fatty acid with a nitrogen base selected from the group consisting of ammonia, aliphatic amines and cyclic amines and heating the water-soluble compounds thus obtained with a polyhydric alcohol to a temperature of between 100° C. and 200° C.

3. The process which comprises treating condensation products obtained from the condensation product of phenol and formaldehyde and chloracetic acid with a nitrogen base selected from the group consisting of ammonia, aliphatic amines and cyclic amines and heating the water-soluble compounds thus obtained with a polyhydric alcohol to a temperature of between 100° C. and 200° C.

4. The process which comprises treating condensation products obtained from the condensation product of phenol and formaldehyde and chloracetic acid with a nitrogen base selected from the group consisting of ammonia, aliphatic amines and cyclic amines and heating the water-soluble compounds thus obtained with glycerin to a temperature of between 100° C. and 200° C.

5. The process which comprises treating phenolaldehyde condensation products containing carboxyl groups with ammonia and heating the water-soluble compounds thus obtained with a polyhydric alcohol to a temperature of between 100° C. and 200° C.

6. The process which comprises treating condensation products obtained from the condensation product of phenol and formaldehyde and chloracetic acid with ammonia and heating the water-soluble compounds thus obtained with glycerin to a temperature of between 100° C. and 200° C.

7. As new products, insoluble and infusible resins containing chemically entirely indifferent carboxyl groups, substantially identical with resins obtainable by treating phenolaldehyde condensation products containing carboxyl groups with a nitrogen base selected from the group consisting of ammonia, aliphatic amines and cyclic amines and heating the water-soluble compounds thus obtained with a polyhydric alcohol to a temperature of between 100° C. and 200° C.

8. As new products, insoluble and infusible resins containing chemically entirely indifferent carboxyl groups, substantially identical with resins obtainable by treating condensation products obtained from a phenolaldehyde resin and a halogen fatty acid with a nitrogen base selected from the group consisting of ammonia, aliphatic amines and cyclic amines and heating the water-soluble compounds thus obtained with a polyhydric alcohol to a temperature of between 100° C. and 200° C.

9. As new products, insoluble and infusible resins containing chemically entirely indifferent carboxyl groups, substantially identical with resins obtainable by treating condensation products obtained from the condensation product of phenol and formaldehyde and chloracetic acid with a nitrogen base selected from the group consisting of ammonia, aliphatic amines and cyclic amines and heating the water-soluble compounds thus obtained with a polyhydric alcohol to a temperature of between 100° C. and 200° C.

10. As new products, insoluble and infusible resins containing chemically entirely indifferent carboxyl groups, substantially identical with resins obtainable by treating condensation products obtained from the condensation product of phenol and formaldehyde and chloracetic acid with a nitrogen base selected from the group, consisting of ammonia, aliphatic amines and cyclic amines and heating the water-soluble compounds thus obtained with glycerin to a temperature of between 100° C. and 200° C.

11. As new products, insoluble and infusible resins containing chemically entirely indifferent carboxyl groups, substantially identical with resins obtainable by treating phenolaldehyde condensation products containing carboxyl groups with ammonia and heating the water-soluble compounds thus obtained with a polyhydric alcohol to a temperature of between 100° C. and 200° C.

12. As new products, insoluble and infusible resins containing chemically entirely indifferent carboxyl groups, substantially identical with resins obtainable by treating condensation products obtained from the condensation product of phenol and formaldehyde and chloracetic acid with ammonia and heating the water-soluble compounds thus obtained with glycerin to a temperature of between 100° C. and 200° C.

In testimony whereof, I affix my signature.

ARTHUR VOSS.